United States Patent [19]

McInnis

[11] Patent Number: 4,511,831

[45] Date of Patent: * Apr. 16, 1985

[54] SPEED CONTROL OF A D.C. ELECTRIC MOTOR

[76] Inventor: Stirling A. McInnis, 661 Kenyon St., Troy, Mich. 48084

[*] Notice: The portion of the term of this patent subsequent to Aug. 24, 1999 has been disclaimed.

[21] Appl. No.: 387,506

[22] Filed: Jun. 11, 1982

Related U.S. Application Data

[63] Continuation-in-part of Ser. No. 251,865, Apr. 7, 1981, Pat. No. 4,346,335.

[51] Int. Cl.³ .............................................. H02P 5/06
[52] U.S. Cl. .................................. 318/351; 318/355; 318/424; 318/529
[58] Field of Search .................... 310/49 R, 180, 184, 310/185, 187, 172; 318/351, 355, 424, 425, 523, 529, 530

[56] References Cited

U.S. PATENT DOCUMENTS

| | | |
|---|---|---|
| 281,353 | 7/1883 | Edison . |
| 315,179 | 4/1885 | Sprague . |
| 691,188 | 1/1902 | Schramm ............................ 318/351 |
| 954,468 | 4/1910 | Rosenberg . |
| 1,112,833 | 10/1914 | Poole . |
| 1,147,417 | 7/1915 | Marburg . |
| 1,164,223 | 12/1915 | Scherbius . |
| 1,334,832 | 3/1920 | Bergman ............................ 310/180 |
| 1,361,546 | 12/1920 | Politowski . |
| 1,496,037 | 6/1924 | Varley . |
| 1,501,488 | 7/1924 | Hunt . |
| 1,554,647 | 9/1925 | Oswald ............................... 318/351 |
| 1,637,887 | 8/1927 | Wilson . |
| 1,685,970 | 10/1928 | Townend et al. ............... 310/187 X |
| 1,700,329 | 1/1929 | Oswald ........................... 318/351 X |
| 1,844,243 | 2/1932 | Crout . |
| 1,895,498 | 1/1933 | Stoller . |
| 1,930,911 | 10/1933 | Stoller . |
| 1,972,689 | 9/1934 | Meyer . |
| 2,028,572 | 1/1936 | Strong ............................. 318/351 X |
| 2,134,685 | 11/1938 | Crise et al. . |
| 2,303,293 | 11/1942 | Thomas . |
| 2,316,779 | 4/1943 | Fisher . |
| 2,323,741 | 7/1943 | Watson . |
| 2,331,960 | 10/1943 | Button . |
| 2,399,931 | 5/1946 | Lamborn . |
| 2,442,213 | 5/1948 | Ross . |
| 2,474,647 | 6/1949 | Binney . |
| 2,500,191 | 3/1950 | Lee . |

(List continued on next page.)

FOREIGN PATENT DOCUMENTS

| | | |
|---|---|---|
| 683252 | 10/1939 | Fed. Rep. of Germany . |
| 214587 | 12/1924 | United Kingdom . |
| 505583 | 5/1939 | United Kingdom . |
| 522130 | 6/1940 | United Kingdom . |
| 558835 | 1/1944 | United Kingdom . |
| 789292 | 1/1958 | United Kingdom . |
| 1559791 | 1/1980 | United Kingdom . |

Primary Examiner—Ulysses Weldon
Attorney, Agent, or Firm—Harness, Dickey & Pierce

[57] ABSTRACT

A novel stator assembly, D.C. electric motor, and method of controlling the speed of the motor is described. The stator assembly includes a pair of field poles, each having a field coil wound around a shank portion, a plurality of separately excitable field control coils wound individually around separate field pole leg members, and a face portion forming a bore for receiving the motor armature. The field poles also have a core portion which provides a magnetic path between the shank and face portion. This core portion permits the magnetic flux in the field poles to shift across the face portion when one or more of the field control coils are energized magnetically subtractive to the flux generated by the field coils. The speed of the motor may be controlled by energizing the field control coils and controlling their polarity with respect to the field coils. A motor controller for the motor according to the present invention is also described, and is particularly useful in an electric vehicle application.

28 Claims, 11 Drawing Figures

U.S. PATENT DOCUMENTS

| | | |
|---|---|---|
| 2,539,791 | 1/1951 | Mozzanini et al. . |
| 2,662,999 | 12/1953 | Pestarini . |
| 2,666,882 | 1/1954 | Pasculle . |
| 2,693,564 | 11/1954 | Pasculle . |
| 2,761,082 | 8/1956 | Chang ................... 310/187 |
| 2,811,685 | 10/1957 | Hoffer . |
| 2,871,435 | 1/1959 | Kenyon . |
| 2,930,960 | 3/1960 | Chausse . |
| 2,939,069 | 5/1960 | Dvoracek . |
| 2,945,998 | 7/1960 | Vanderberg . |
| 3,007,068 | 10/1961 | Arnold et al. ................ 310/187 X |
| 3,054,008 | 9/1962 | Huttenlocher ................ 318/351 X |
| 3,153,184 | 10/1964 | Stout ................ 310/184 |
| 3,154,708 | 10/1964 | Shaffer ................ 310/187 |
| 3,207,967 | 9/1965 | Athey . |
| 3,286,150 | 11/1966 | Wilson et al. . |
| 3,289,063 | 11/1966 | Short . |
| 3,295,034 | 12/1966 | Herzog ................ 310/184 |
| 3,348,111 | 10/1967 | Woehler ................ 318/523 X |
| 3,366,864 | 1/1968 | Pasculle . |
| 3,426,225 | 2/1969 | Bakhuizen ................ 310/187 X |
| 3,493,833 | 2/1970 | Swanke ................ 318/523 X |
| 3,497,788 | 2/1970 | Kerrigan et al. . |
| 3,515,919 | 6/1970 | Houtman ................ 310/184 X |
| 3,590,352 | 6/1971 | Ries . |
| 3,596,161 | 7/1971 | Swanke . |
| 3,753,068 | 8/1973 | Walker, Jr. . |
| 3,780,324 | 12/1973 | Greenwell ................ 310/180 |
| 3,866,110 | 2/1975 | Ruggeri ................ 310/187 X |
| 3,924,169 | 12/1975 | Craft et al. . |
| 3,986,062 | 10/1976 | Morrill . |
| 4,019,106 | 4/1977 | Van Doren ................ 318/529 X |
| 4,042,865 | 8/1977 | Gurwicz . |
| 4,075,521 | 2/1978 | Nordebo ................ 310/184 |
| 4,217,529 | 8/1980 | Bourke et al. . |
| 4,296,344 | 10/1981 | Rabe ................ 310/184 |
| 4,346,335 | 8/1982 | McInnis ................ 318/351 |

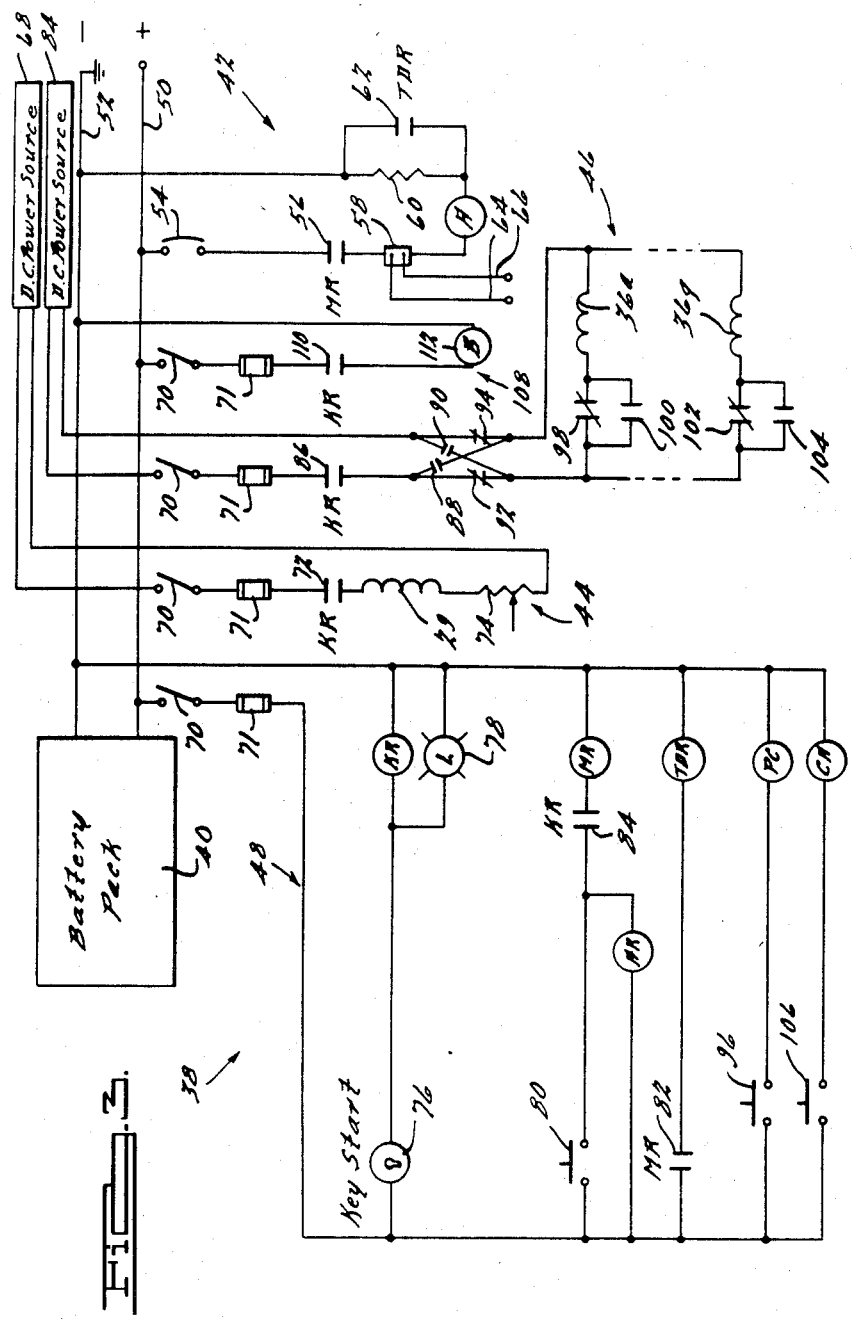

SPEED CONTROL OF A D.C. ELECTRIC MOTOR

CROSS REFERENCE TO A RELATED APPLICATION

This application is a continuation-in-part of application Ser. No. 251,865, filed Apr. 7, 1981, now U.S. Pat. No. 4,346,335, which is hereby incorporated by reference.

BACKGROUND AND SUMMARY OF THE INVENTION

The present invention relates generally to D.C. electric motors, and particularly to the speed control of separately excited or shunt wound D.C. electric motors.

The speed of a D.C. electric motor may be varied by changing the field strength of the motor, by changing the armature voltage, or by inserting a resistance in the armature circuit. For example, the speed of a separately excited or shunt wound motor may be increased by weakening the field, which lowers the counter E.M.F. (electromotive force) generated by the armature to maintain a balance of the load, counter E.M.F. and applied E.M.F. Although a variation in the field strength provides a constant horsepower, the torque of the engine will vary over the speed range when the armature current is held constant. Accordingly, the motor will produce a high torque at low speeds and a low torque at high speeds. This characteristic of a shunt wound or separately excited motor causes a problem when the load on the motor is suddenly increased, because the speed of the motor will decrease if the torque is insufficient to meet the new demand. This is particularly disadvantageous when the motor is used as a propulsion motor for an electric vehicle, where a high torque would be required for climbing a hill or passing another vehicle.

Another aspect of controlling the speed of a motor by varying the strength of the field is the speed range available. A typical shunt wound or separately excited motor will provide a speed up to 2.5 times the rated speed by weakening the field. However, in order to get a substantial decrease from the rated speed, it is necessary to lower the voltage in the armature circuit, because the strength of the field cannot be increased beyond its designed characteristics. Providing for an adjustment in the armature voltage is considered undesirable, as this will increase the complexity and cost associated with the motor controller. In the case of a shunt wound motor, the speed range is further constrained, because the applied E.M.F. is the same for both the armature and the field. Accordingly, when the applied E.M.F. is adjusted to vary the strength of the field, the current through the armature varies as well.

The present invention provides a novel and improved shunt wound or separately excitable D.C. electric motor which has a wide speed range available and is capable of producing a high torque at high speeds. Particularly, the motor features a novel stator assembly, which generally includes a pair of field poles, each having a field coil wound around a shank portion, a face portion forming a bore for receiving the motor armature, and a plurality of separately excitable field control coils wound individually around the field pole leg members associated with the face portion of the field poles. An important aspect of the present invention is a core portion of the field pole, which provides a magnetic path between the shank and face portion. This core portion permits the magnetic flux in the field poles to shift across the face portion when one or more of the field control coils are energized magnetically subtractive to the flux generated by the field coils, as will be more fully described below. Another important aspect of the present invention is the provision of an air gap between adjacent field control coils. These air gaps operate to direct the flow of magnetic flux through the field pole by members and thereby reduce any stray magnetic radiation across the field pole members which may occur.

The present invention also provides a novel method of controlling the speed of the shunt wound or separately excited motor. In a starting condition, all of the field control coils are energized magnetically additive to the flux generated by the field coils. The starting condition represents the lowest operating speed of the motor, as the field coils and field control coils cooperate to provide the strongest capable field. The speed of the motor may be increased from this starting condition by de-energizing the field control coils in a predetermined sequence. As each field control coil is de-energized the field is weakened, thereby lowering the counter E.M.F. and causing the speed of the motor to increase in gradual steps. The speed of the motor may be further increased by energizing the field control coils in a predetermined sequence, magnetically subtractive to the flux generated by the field coils. This causes the magnetic flux in the field poles to shift across the face portion, such that the flux generated by the field coils will shift away from the subtractively energized field control coils. Thus, if the field control coils are subtractively energized at each end of the field pole members, the field coil flux will shift away from these energized field control coils toward a central section of the field pole members. This effectuates a reduction of the number of active armature coil turns, thereby lowering the counter E.M.F. generated by the armature. As the counter E.M.F. decreases, the speed of the motor will increase in order to maintain a balance of the load, counter E.M.F. and applied E.M.F. Accordingly, as each of the field control coils are subtractively energized, further gradual increases in the speed of the motor may be achieved. The speed of the motor may subsequently be decreased by reversing the sequence of steps just described.

It will be appreciated by those skilled in the art that a wide speed range may be achieved with the novel motor and speed control method according to the present invention. The number of speed gradations will, of course, be dependent upon the number of field control coils provided in each of the field poles. It should also be appreciated that in addition to controlling the polarity of the field control coils, the voltage applied to these coils may also be varied to provide further and more continuous gradations in speed.

As stated above, another advantage of the present invention is the capability of providing a high torque at high speeds. When the field control coils are subtractively energized in a predetermined sequence, the magnetic flux in the field poles will shift across the face portion, thereby concentrating the flux lines over a narrow portion of the pole faces. This narrow, but strong flux pattern provides a high torque across the active turns of the armature.

The present invention further provides a novel motor controller, which is particularly advantageous when the motor is used to drive an electric vehicle. In addition to providing speed control circuitry for a motor in accordance with the present invention, the motor controller also provides regenerative control circuitry for re-charging the electric vehicle battery during de-acceleration. When the vehicle accelerator is released, the motor controller will energize all of the field control coils magnetically additive to the flux generated by the field coils. This will cause the counter E.M.F. to rise above the applied E.M.F., resulting in a charge being returned to the battery as the vehicle slows down. Thus, during de-acceleration the motors acts as a generator, re-charging the battery and providing a dynamic braking force for the vehicle.

Other features and advantages of the invention will become apparent in view of the drawings and the following detailed description of the preferred embodiment.

BRIEF DESCRIPTION OF THE DRAWINGS

FIG. 5 is a fragmentary side elevation view of a stator assembly and armature for a D.C. electric motor in accordance with the present invention.

DESCRIPTION OF THE PREFERRED EMBODIMENT

Figure 1:
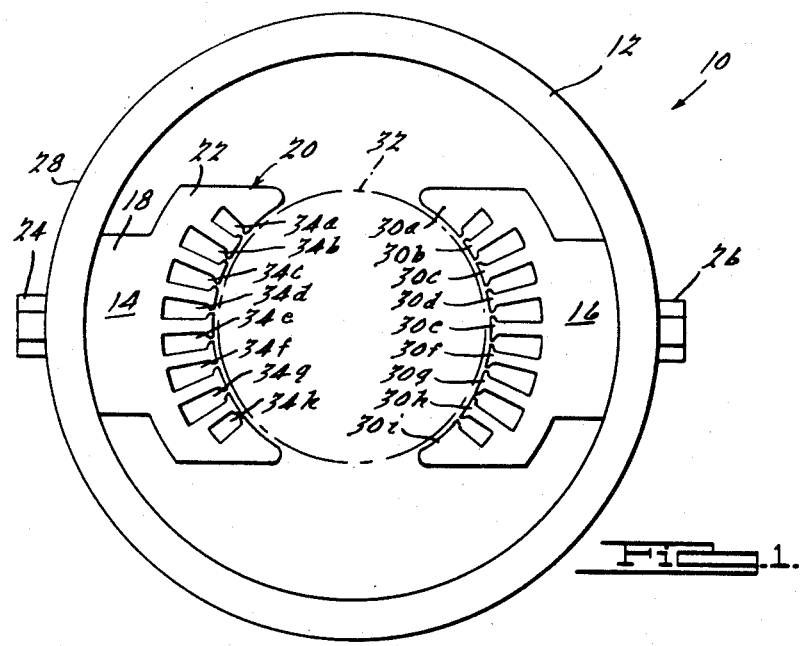
FIG. 1 is a side elevation view of a yoke and a pair of opposing field poles for a stator assembly in accordance with the present invention.
Figure 2:
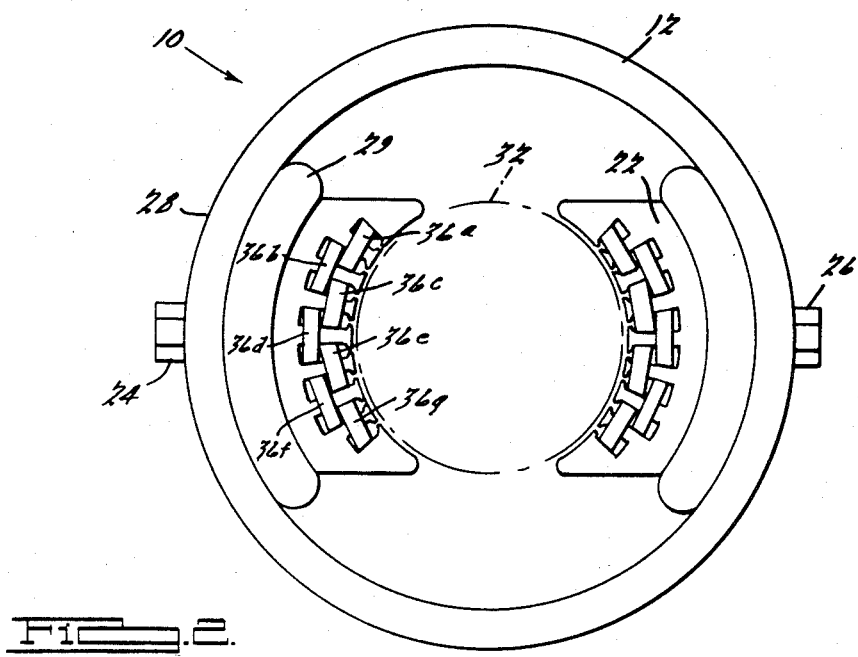
FIG. 2 is a side elevation view of a stator assembly for a D.C. electric motor in accordance with the present invention.

Referring to FIGS. 1 and 2, a stator assembly 10 according to the present invention is shown. With respect to FIG. 1, a side elevation view of a yoke member 12 and a pair of opposing field pole members 14 and 16 are illustrated. The yoke 12 provides a frame for the D.C. electric motor, is made from an open cylindrical construction conventional in the art. Each field pole member includes a shank portion 18, a face portion 20 and a core portion 22 interposed between the shank and face portions. The shank portions 18 are mounted to the yoke member 12 by bolts 24 and 26. These bolts may also be counter sunk into the yoke member 12, so as not to extend beyond the outer surface 28 of the yoke member. Additionally, the shank portions 18 may be mounted to the yoke member 12 by other conventional means, such as dove-tailing and the like. As illustrated in FIG. 2, each of the field pole members 14 and 16 is provided with a conventional field coil 29 wound around the shank portions 18.

The face portions 20 of the field pole members 14 and 16 are defined by a plurality of field pole leg members 30a–i, which extend radially inwardly to form a bore for receiving an armature 32. The field pole leg members 30a–i in turn define slots 34a–h for receiving a plurality of field control coils 36a–g, shown in FIG. 2. The field control coils 36a–g are separately excitable, and are individually wound around the field pole leg members 30b–h. The outer field pole leg members 30a and 30i at each end of the field pole members are not provided with a field control coil, but may be so provided in the appropriate application.

In a preferred form of the present invention, the outer slots 34a and 34h are shorter in radial depth than the inner slots 34b–g, as been seen in FIG. 1. With this arrangement, the field control coils 36b, 36d and 36f are disposed geneally between and extend radially outwardly from the field control coils 36a, 36c, 36e and 36g. Thus, the field control coils 36a–g form two rows extending across the face portions 20 of the field pole members 14 and 16 in a very compact construction. As pointed out above, the number of speed gradations is at least in part dependent upon the number of field control coils provided in the face portions 20 of the field pole members. Accordingly, other similar techniques for winding the field control coils to provide a compact construction may also be employed.

An important feature of the present invention is the provision of the core portions 22 in the field pole members 14 and 16. These core portions provide a magnetic path between the shank portions 18 and the face portions 20, and are adapted with a sufficient radial depth to permit the magnetic flux in the field pole members 14 and 16 to shift across the face portions 20 when one or more of the field control coils 36a–g are energized magnetically subtractive to the flux generated by the field coils 29.

As stated above, the present invention relates to separately excited or shunt wound D.C. electric motors. With respect to the field control coils 36a–g, it has already been noted that these coils are separately excited, so that the polarity and/or strength of excitation may be individually controlled. With respect to the field coils 29, these coils may also be separately excited as well known in the art. Additionally, the field coils 29 may be connected electrically in parallel with each other and with the armature circuit to provide a shunt wound motor configuration. Alternatively, the field coils 29 may be connected in series with each other, and then connected in parallel with the armature circuit as well.

It should also be appreciated that another pair of opposing field pole members may be provided from a 4-pole D.C. electric motor. Similarly, further additional poles may be provided in the appropriate application. In the case of a 4 or 6-pole motor, the width of the field pole members will, of course, be more constrained than in the 2-pole configuration illustrated in FIGS. 1 and 2. This will in turn affect the number of field control coils which may be provided in the face portions of the field pole members. However, it is preferred that at least three field control coils be provided in order to maintain a reasonable range of speed gradations.

The present invention also provides a novel method of controlling the speed of the shunt wound or separately excited motor. In a starting condition, all of the field control coils 36a–g are energized magnetically additive to the flux generated by the field coils 29. The starting condition represents the lowest operating speed of the motor, as the field coils 20 and field control coils 36a–g cooperate to provide the strongest capable field. The speed of the motor may be increased from this starting condition by de-energizing the field control coils 36a–g in a predetermined sequence. As each field control coil is de-energized the field is weakened, thereby lowering the counter E.M.F. and causing the speed of the motor to increase in gradual steps. For example, field control coil 36a may be de-energized first, followed by coil 36b, 36c, and so forth. Alternatively, field control coil 36g may be de-energized first, followed by coil 36f, coil 36e, and so forth. Similarly, field control coil 36b may be de-energized first, followed by coil 36d, coil 36f, coil 36a, coil 36c, and so forth. Other sequences may also be provided in the appropriate application.

The speed of the motor may be further increased by energizing the field control coils in a predetermined sequence, magnetically subtractive to the flux generated by the field coils. This causes the magnetic flux in the field poles to shift across the face portion, such that the flux generated by the field coils will shift away from the subtractively energized field control coils. Thus, if the field control coils are subtractively energized from top to bottom (i.e., coil 36a to 36g), the field coil flux will shift from left to right away from the enrgized field control coils. This effectuates a reduction of the number of active armature coil turns, thereby lowering the counter E.M.F. generated by the armature. As the counter E.M.F. decreases, the speed of the motor will increase in order to maintain a balance of the load, counter E.M.F. and applied E.M.F. Accordingly, as each of the field control coils are subtractively energized, further gradual increases in the speed of the motor may be achieved. While it is preferred that the field control coils 36a–g be subtractively energized from one end of the field poles to the other, other suitable sequences may be provided in the appropriate application. However, the sequence employed should be such as to concentrate the magnetic flux lines over a narrow portion of the pole faces in order to provide a high torque in the high speed range. For example, when field control coils 36a–c are subtractively energized and coils 36f and 36g are de-energized a strong flux pattern will be present in field pole by members 34f–h. This strong, but narrow flux pattern will produce a high torque across the active turns of the armature. The speed of the motor may subsequently be decreased by reversing the sequence of steps just described.

It will be appreciated by those skilled in the art that a wide speed range may be achieved with the novel motor and speed control method according to the present invention. The number of speed gradations will, of course, be dependent upon the number of field control coils provided in each of the field poles. For example, in the embodiment illustrated in FIGS. 1 and 2 a total of fifteen speed gradations are provided by controlling the field control coils 36a–g in the method just described. It should also be appreciated that in addition to controlling the polarity of the field control coils, the voltage applied to these coils may also be varied to provide further and more continuous gradations in speed. Additionally, the voltage applied to the field coils 29 may also be varied, as is conventional in the art.

Figure 3:
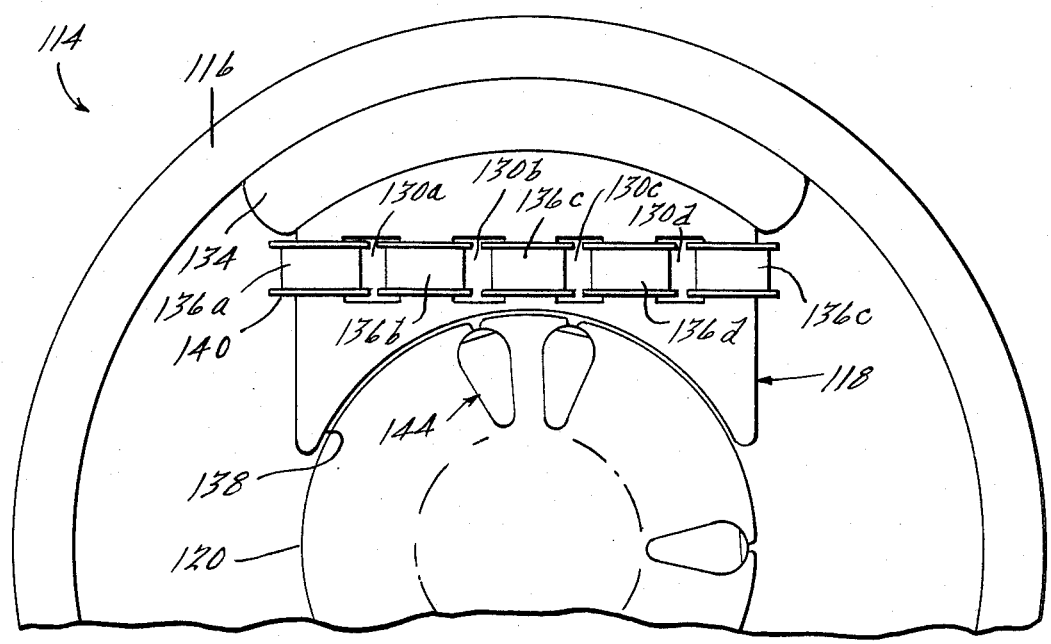
FIG. 3 is a circuit diagram of a motor controller in accordance with the present invention.

Referring to FIG. 3, a circuit diagram of a motor controller 38 according to the present invention is shown. In the embodiment illustrated, motor controller 38 is intended for use in an electric vehicle. However, it will be appreciated by those skilled in the art that the motor controller may be suitably modified for other appropriate motor control applications. The source of electrical power for the D.C. electric motor as well as motor controller 38 is provided by a battery pack 40. The battery pack forms no part of the present invention, and may be comprised of any suitable D.C. power source. Motor controller 38 generally includes an armature control circuit 42, a field coil circuit 44, a field control coil circuit 46 and a relay control circuit 48. Armature circuit 48 is connected across a positive polarity output line 50 and a negative polarity output line 52 of the battery pack 40 . Armature circuit 42 is comprised of a circuit breaker 54, "MR" relay contacts 56, a shunt resistor 58, a conventional armature circuit "A", a starting resistor 60, and "TDR" relay contacts 62. The contacts 56 are normally open, and are controlled by a main motor relay "MR" in relay control circuit 48. Shunt resistor 58 is used to sense the current through armature control circuit 42, and is connected to an amperage sensing relay "AR" in the relay control circuit 48 via lines 64 and 66. The starting resistor 60 is connected in series with the armature circuit "A" to prevent a high in rush of current when the motor is started, as is conventional in the art. The contacts 62 are connected across starting resistor 60 to provide a short circuit across this resistor shortly after the motor is started. Contacts 62 are controlled by a time delay relay "TDR" in relay control circuit 48.

The field control circuit 44 is connected to a D.C. power source 68 for providing separate excitation of the field coils 29. However, the field control circuit 44 may be connected across the output lines 50 and 52 of the battery pack 40 to provide a shunt wound motor configuration in the appropriate application. Field control circuit 44 is comprised of a disconnect switch 70, a fuse 71, "KR" relay contacts 72, the field coils 29, and a field rheostat 74. Contacts 72 are controlled by a key operated relay "KR" in the relay control circuit 48. With regard to the connecton of the field coils 29, it should be understood that the single coil illustrated is generic in nature, and that the field coils may be connected electrically in series or parallel with each other. The disconnect switch 70 is connected to the positive polarity output line 50, so that the field control circuit 44 may be disconnect from power source 68 during maintenance or repair. The field rheostat 74 is used to vary the voltage applied to the field coils 29, and thereby control the strength of the field. The disconnect switch 70, the fuse 71, and the field rheostat are all conventional and well known in the art. As illustrated, all of the circuits in motor controller 38 include a disconnect switch 70 and a fuse 71, except for the armature control circuit 42 which utilizes the circuit breaker 54 as reflective of the high amperage through that circuit.

The relay control circuit 48 is also connected across the battery pack output lines 50 and 52. Relay control circuit 48 is used to control or energize a number of relays, including the "MR", "TDR", "AR", and "KR" relays already identified. Relay control circuit 48 includes a switch 76, labeled "KEY START", which is equivalent to a key operated ignition switch in a gas engine powered vehicle. When the vehicle operator throws the "KEY START" switch 76, the key operated relay "KR" will energize, closing all of the "KR" relay contacts in motor controller 38. Thus, when the "KR" relay is energized the "KR" relay contacts 72 in the field coil circuit 44 will close, thereby connecting the field coil circuit 44 with the D.C. power source 68. The relay control circuit 48 is also provided with a lamp 78, connected across the "KR" relay. The lamp 78 is used to provide a visual indication to the vehicle operator that the "KR" relay has been energized and the vehicle is ready to operate.

The main motor relay "MR" in relay control circuit 48 is controlled by a throttle switch 80, which is connected to an accelerator pedal (not shown). In a preferred form of the invention, the throttle switch 80 will close when the vehicle operator begins to depress the accelerator pedal. When the main motor relay "MR" is energized, the "MR" relay contacts 56 in the armature control circuit 42 will close, thereby connecting the armature control circuit to the battery pack 40. An additional set of "MR" relay contacts 82 is also included in the relay control circuit 48 for controlling the time delay relay "TDR". Thus, as the same time the armature control circuit 42 is connected to the battery pack 40, the time delay relay "TDR" will also be energized. The time delay relay "TDR" is adapted to remain open for a preselected period after it is energized, and then close to short out starting resistor 60. It should be noted that an additional set of "KR" relay contacts 84 is connected in series with the "MR" relay. This is to insure that the field coil circuit 44 will always be energized before the armature control circuit 42 is energized, to prevent a runaway condition which might otherwise occur.

The field control coil circuit 46 is connected to a D.C. power source 84 for providing separate excitation of the field control coils 36a–g. Field control coil circuit 46 generally includes the field control coils 36a–g, "KR" relay contacts 86, and four sets of polarity control contacts 88–94. Contacts 92 and 94 are normally closed, and represent the condition where the field control coils 36a–g are energized magnetically additive to the flux generated by the field coils 29. Contacts 88 and 90 are normally open, and used to reverse the polarity of the field control coils 36a–g, so that they may be energized magnetically subtractive to the flux generated by the field coils 29. Accordingly, for additive polarity contacts 92 and 94 will be closed and contacts 88 and 90 will be open. Similarly, for subtractive polarity contacts 92 and 94 will be open and contacts 88 and 90 will be closed. The contacts 88–92 are controlled by a polarity control relay "PC" in relay circuit 48, which is energized by a throttle controlled switch 96. The state of the switch 96 will be dependent upon the position of the accelerator pedal. Switch 96 will be in an opened state when the accelerator pedal is not depressed. At some point along the depression of the accelerator pedal switch 96 will close, thereby energizing the "PC" relay and reversing the polarity of the field control coils 36a–g.

For simplicity, only field control coils 36a and 36g are shown in FIG. 3. It should be understood that the illustration of these field control coils are generic in nature. Thus, field control coil 36a may represent this coil in both of the field pole members 14 and 16. Alternatively, it may be desirable in the appropriate application for the motor controller 38 to include a separate field control circuit 46 for each of the field pole members, so that the field control coils in the field pole members may be separately controlled.

Each of the field control coils 36a–g in circuit 46 are provided with two sets of contacts, such as contacts 98 and 100 for coil 36a and contacts 102 and 104 for coil 36g. Contacts 98 and 102 are shown to be normally closed so that when the accelerator pedal is not depressed, coils 36a and 36g (as well as the other field control coils not shown) may be energized magnetically additive to the flux generated by the field control coils 29. Contacts 98 and 102 may subsequently be opened in order to deenergize the field control coils in the predetermined sequence above described. Contacts 98 and 102 are actuated by suitable relays which are throttle controlled. One such relay, labeled "CA", is illustrated as part of relay control circuit 48. Relay "CA" controls the contacts 98 for field control coil 36a, and is energized by a throttle controlled switch 106. For simplicity, the remaining relays for controlling the normally closed contacts, such as contacts 102, for the other field control coils are not shown in FIG. 3.

Also included in field control coil circuit 46 are contacts 100 for coil 36a and contacts 104 for coil 36g. These contacts are normally open, and are also actuated by throttle controlled relays similar to relay "CA". The contacts 100 and 104 (as well as the other normally open contacts now shown) are utilized when the field control coils 36a–g are to be energized magnetically subtractive to the flux generated by the field coils 29. Accordingly, contacts 100 will close to subtractively energize field control coil 36a, and contacts 104 will close to subtractively energize field control coil 36g. This, of course, assumes that coils 36a and 36g have already been deenergized by opening contacts 98 and 102.

Accordingly, one sequence of operation for motor controller 38 is as follows. First, the vehicle operator throws the key start switch 76 to energize the "KR" relay. This will connect the field coil circuit 44 to power source 68 and the field control coil circuit 46 to power source 84. In this condition, all of the field control coils 36a–g will be energized magnetically additive to the flux generated by the field coils 29. Then, as the vehicle operator sligly depressed the accelerator pedal, switch 80 will close, energizing the "MR" relay and connecting the armature control circuit 42 to the battery pack 40. This situation represents the starting condition described above. As the vehicle operator depresses the accelerator pedal slightly further, switch 106 will close. This will open contacts 98 and de-energize field control coil 36a. With coil 36a de-energized, the speed of the motor will increase from the starting condition. Then, as the vehicle operator continues to depress the accelerator pedal, the other field control coils will be de-energized in a predetermined sequence, via switches, relays and contacts similar to switch 106, relay "CA" and contacts 98 respectively. Then, as the accelerator pedal is depressed slightly further, switch 96 will close and the "PC" relay will be energized. This will open contacts 92 and 94, and close contacts 88 and 90. At this point, the field control coils 36a–g may now be subtractively energized. Accordingly, when the accelerator pedal is depressed slightly, further contacts 100 will close, thereby energizing coil 36a magnetically subtractive to the flux generated by the field coils 29. Similarly, as the accelerator pedal continues to be depressed, the remaining field control coils will also be subtractively energized. Thus, when the accelerator pedal is fully depressed, all of the normally open contacts, such as contacts 100 and 104, will be closed. At this point the motor will be running at top speed.

The electric vehicle may be stopped by releasing the accelerator pedal. This will return all of the field control coils to the magnetically additive position. However, the "MR" relay will remain energized until the current through the armature control circuit 42 decreases to a predetermined point. This feature is provided by the amperage sensing relay "AR" and the shunt resistor 58 already identified. This provision is to allow the motor to act as a generator during de-acceleration, thereby recharging the battery and dynamically braking the electric vehicle. As the vehicle de-accelerates, the counter E.M.F. generated by the armature circuit "A" will rise above the applied E.M.F. This will result in a charge being returned to the battery pack 40. However, as the speed decreases, the generated E.M.F. also decreases, and the armature control circuit 42 must subsequently be disconnected from the battery pack 40 before the vehicle stops. Otherwise, the motor will cease acting as a generator and revert to acting as a motor, thereby driving the vehicle at the time the vehicle operator desires the vehicle to stop. Accordingly, shunt resistor 58 is used to sense the current through the armature circuit 42, and energize the "AR" relay at the predetermined low current value. When the "AR" relay energizes, the "MR" relay will de-energize, thereby disconnecting the armature control circuit 42 from the battery pack 40.

Motor controller 38 also includes a motor cooling circuit 108 connected across the output lines 50 and 52 of the battery pack 40. Motor cooling circuit 108 includes a set of "KR" relay contacts 110 and a blower or fan 112. Because the motor operates at various speeds, it is considered desirable to provide a separate air blower for cooling. It should be understood that motor cooling circuit 108 is of the type conventional in the art, and may not be required in the appropriate application.

It should be understood that even though the motor controller 38 is described in terms of relays to perform the various switching functions, other switching means may also be utilized. Accordingly, the relays may be replaced by conventional electronic components, as exemplified by switching transistors, silicon controlled rectifiers, and so forth. Additionally, the D.C. electric motor according to the present invention may utilize a micro-computer or programmable controller as the basis of a motor controller in the appropriate application.

Figure 4:
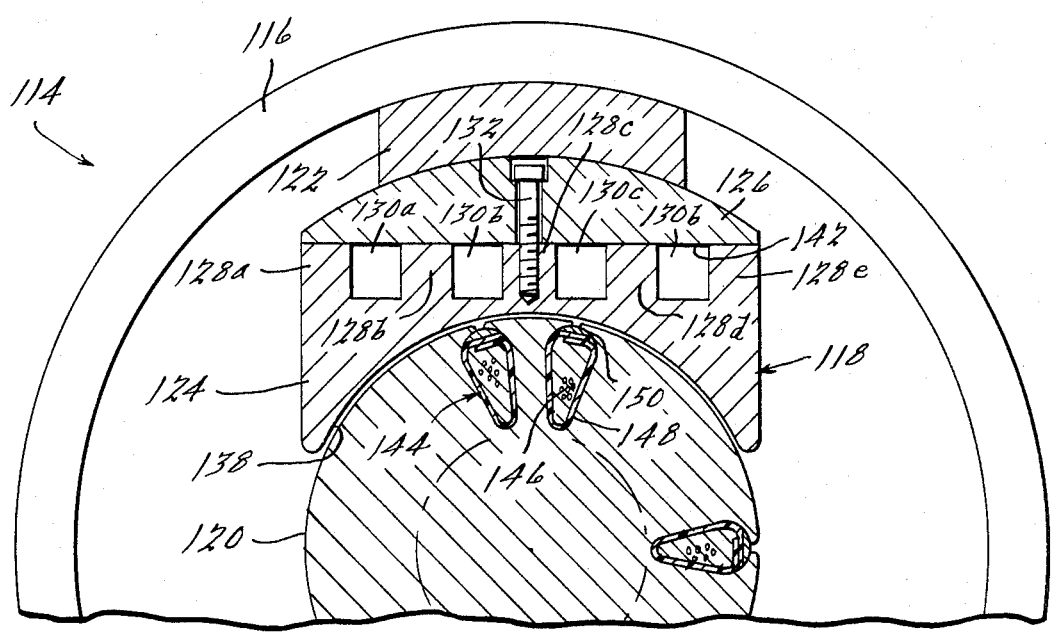
FIG. 4 is a fragmentary side elevation view of a yoke, field pole, and armature, partially in cross-section, for a D.C. electric motor in accordance with the present invention.

Referring to FIG. 4, a fragmentary side elevational view of a partially assembled D.C. electric motor 114 according to the present invention is shown. The motor 114 includes a yoke member 116, a pair of opposing field pole members (of which only the field pole member 118 is shown), and an armature 120. Since the field pole members are preferably identical in construction, only the construction for the field pole member 118 will be described, and it should be understood that this construction is equally applicable to the field pole member not shown. The field pole member 118 generally comprises a shank portion 122 mounted to the yoke member 116, a face portion 124 forming a bore for receiving the armature 120, and a core portion of 126 interposed radially between the shank portion 122 and the face portion 124 for providing a magnetic path between the shank portion and the face portion. A plurality of spaced, generally radially extending field pole leg members 128a–e are provided in association with the face portion 124, and define slots 130a–b for receiving a plurality of field control coils, as will be more fully described below. The face portion 124 and the field pole leg members 128a–e are preferably formed from a single or unitary steel body. Similarly, the shank portion 122 and the core portion 126 are also preferably formed from a unitary steel body. These two steel bodies are secured together by a plurality of bolts 132 which mount the face portion 124 and the field pole leg members 128a–e to the shank portion 122 and core portion 126. However, it should be understood that this mounting method is intended to be exemplary only, and that other suitable mounting methods which provide for the necessary electrical and mechanical contact may be utilized in the appropriate application.

Referring to FIG. 5, the D.C. electric motor 114 is shown to be provided with a conventional field coil 134 wound around the shank portion 122 of the field pole member 118, and a plurality of separately excitable field control coils 136a–e would individually around each of the field pole leg members 128a–e of the field pole member. It should be understood that the field pole member (not shown) opposing the field pole member 118 will also be provided with this field coil and field control coil construction. It will thus be seen that the core portion 126 of the field pole member 118 separates the field coil 134 from the field control coils 136a–e. As in the case of the core portion 22 shown in FIGS. 1 and 2, the core portion 126 is adapted to have a sufficient radial depth which permits the magnetic flux in the field pole members to shift across the face portion 124 when one or more of the field control coils 136a–e are energized magnetically subtractive to the flux generated by the field coils 134, such that the magnetic flux generated by the field coil is shifted away from the subtractively energized field control coil(s) and concentrated in a predeterminable section of the field pole face portion. Accordingly, the core portion 126 extends continuously across the entire width of the field pole member 118, and has a radial depth which permits the magnetic flux generated by each of the field control coils 136a–e to circulate through the core and face portions without having to pass through the shank portion 122 or the main field coil 134. It should be noted however that the radial depth provided by the core portion 126 need not be uniform across the width of the field pole member 118. However, the radial depth should be of such a magnitude that the magnetic flux generated by the field and field control coils will not saturate the core portion.

Although the general relationship between the field coil, core portion and field control coils of the stator assembly shown in FIG. 5 is similar to that of the stator assembly shown in FIG. 2, there are nevertheless several important differences in these constructions. First, it should be noted that the face portion 124 of the field pole member 118 is shaped to provide a continuous, generally cylindrical surface 138 as a bore for receiving the armature 120. This is in contrast to the face portion 20 of the stator assembly 10 where the slots 134a–h interrupt the surface of the face portion forming a bore for receiving the armature 32. One advantage of the continuous, generally cylindrical surface 138 of the field pole face portion 124 in comparison with the interrupted surface of the field pole face portion 20 is that the inwardly extending field pole leg members 30a–i may cause an A.C. voltage to be induced or generated by the field control coils 36a–g. Although this A.C. induced voltage may be suppressed by conventional electronic circuitry, the continuous, generally cylindrical surface 138 provided by the face portion 124 will eliminate or significantly reduce this voltage from being induced in the field control coils 136a–e. Accordingly, the stator construction shown in FIGS. 1 and 2 may be modified in accordance with the present invention by simply closing the gaps between the field pole leg members 30a–i at the surface of the face portion 20 opposing the armature 32 to provide a continuous, generally cylindrical surface.

It should also be noted the depth of the face portion 124 between the surface 138 and the innermost edge of the slots 130a–e should be controlled for at least two reasons. While the above-identified radial depth should provide a continuous magnetic path across the width of the field pole member 118, this depth should not be such as to allow the magnetic flux being shifted by one or more subtractively energized field control coils to shift back across the face portion 124. Accordingly, it is preferred that the depth be narrow enough to prevent any significant re-shifting of the magnetic flux generated by the field coil 134, yet wide enough that an A.C. voltage is not induced in the field control coils. This geometry is provided by the narrow depth near the center of the field pole member 118 adjacent the field control coils 136b–d. The decreasing depth from ends of the field pole member 118 toward the center of the field pole member will operate to resist any significant re-shifting of the magnetic flux across the field pole face portion 124 by saturating the narrow center region of the face portion with magnetic flux. It should be appreciated that the field control coils 136a–e may also be mounted to the field pole member 118 such that the distances between each of the field control coils and the face portion surfaces 138 are equal. This geometry may be best visualized with reference to the position of field control coils 36a, 36c, 36e, and 36f of FIG. 2 in the face portion 20 of the field pole member 14. The second reason for controlling the depth of the face portion 124 between the surface 138 and the innermost edge of the slots 130a–e is that it is especially advantageous for the magnetic flux generated by the field control coils to cut or pass through at least one of the armature coils, as will be more fully described below with reference to FIGS. 7–11.

Another significant advantage of the stator assembly for the D.C. electric motor 114 shown in FIG. 5, is the provision of an air gap between adjacent field control coils in the field pole member 118. These air gaps are provided by the slots 130a–d, and are controlled by the spacing between the field pole leg members 128a–e and the windings or number of turns for the field control coils 136a–e. These air gaps operate to direct the flow of magnetic flux through the field pole leg members 128a–e and thereby reduce any stray magnetic radiation which may occur across the field pole member 118. As will be appreciated by those skilled in the art, the air gaps provide paths of relatively high resistance to the flow of magnetic flux in comparison with the steel field pole leg members 128a–e. Accordingly, these air gaps tend to force the flow of magnetic flux through the well defined field pole leg members 128a–e across the width of the field pole member 118. The width of these air gaps or the separation between the field control coils 136a–e should also be of a sufficient magnitude to separate the magnetic fields being generated in order to prevent any of these magnetic fields being cancelled by opposing magnetic fields.

Another important advantage of the stator assembly for the D.C. electric motor 114 is its ease of manufacturability. For example, all of the field control coils 136a–e are all shown to be mounted on bobbins, such as bobbin 140 for field control coil 136a. Accordingly, each of the field control coils 136a–e may be wound separately from the field pole member 118 and subsequently mounted individually on the field pole leg members 128a–e. After all of the field control coils 136a–e are mounted on their respective field pole leg members 128a–e, the face portion 124 may then be mounted to the shank portion 128 and core portion 126 via bolts 132.

As may best be seen with reference to FIG. 4, the core portion 126 is provided with a flat, generally planar surface 142 which engages each of the field pole leg members 128a–e. This construction permits the field control coils 136a–e to be aligned in a single row across the field pole member 118. However, it should be appreciated that the core portion 126 may be shaped such that the surface 142 is generally cylindrical in character, such as surface 138 of the face portion 124. Additionally, the core portion 126 may be formed such that the field pole leg members 128a–e extend radially inwardly therefrom in a unitary body with the shank portion 122. In either case, the field pole leg members 128a–e will nevertheless still be associated with the base portion 124 as the face portion will be in contact with these field pole leg members.

In contrast to the stator assembly 10 of FIG. 2, it should be noted that the stator assembly of FIG. 5 is provided with a field control coil wound around each of the end field pole leg members 128a and 128e. These field control coils 136a and 136e permits control of the flow of magnetic flux across the full width of the field pole member 118. It should also be noted that the dimensions of the field pole leg members 128a–e should be such that the energization of one or more of the field control coils 136a–e will not cause these leg members to saturate with magnetic flux.

Referring again to FIG. 4, the armature 120 of the D.C. electric motor 114 is shown to be provided with a plurality of armature coils 144. These armature coils 144 are disposed comferentially around the armature 120, and generally comprise coil turns 146, insulating sleeve 148 and a spacer member 150. These armature coils 144 illustrate how the field control coils 136a–e may be used to control the speed of the motor 114. The speed of the motor 114, as well as any D.C. electric motor, is the result of the difference between the impressed armature voltage and the counter voltage or E.M.F. developed by the armature. In accordance with the present invention, the voltage impressed upon the armature need not be varied to change the speed of the motor 114. Rather, the field control coils 136a–e are used to control the number of active armature coil turns, and thereby control the counter voltage developed by the armature. As the counter voltage or E.M.F. decreases, the speed of the motor will increase in order to maintain a balance of the load, counter E.M.F. and applied E.M.F. Thus, when one or more of the field control coils 136a–e are energized magnetically subtractive to the flux generated by the field coil 134, the magnetic flux generated by the field coil is shifted away from the subtractively energized field control coil(s). This shifting of magnetic flux also shifts the magnetic flux away from one or more of the armature coils 144, thereby rendering these armature coils inactive or less active. This effect may be more readily visualized with reference to FIGS. 6–11.

Figure 6:
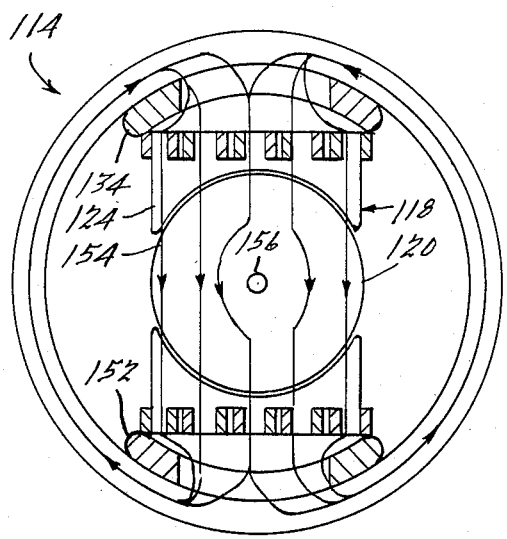
FIG. 6 is a side elevation view of a D.C. electric motor, partially in cross-section, and particularly illustrating the general direction of the magnetic flux paths through the motor when the field control coils are de-energized or energized magnetically additive to the flux generated by the field coils.

Referring to FIG. 6, a side elevation view of the D.C. electric motor 114, partially in cross-section, is shown. FIG. 6 particularly illustrates the general direction of the magnetic flux paths through the motor when the field control coils 136a–e are de-energized or energized magnetically additive to the flux generated by the field coils 134 and 152. It should be noted that the magnetic flux paths, such as flux path 154, travel in a generally straight line through the face portion 124 of the field pole member 118. The curved flux paths around the center of the armature 120 merely reflect the fact that a shaft 154 extends through the center of the armature and that the flux paths will tend to seek the path of least resistance around this shaft.

Figure 7:
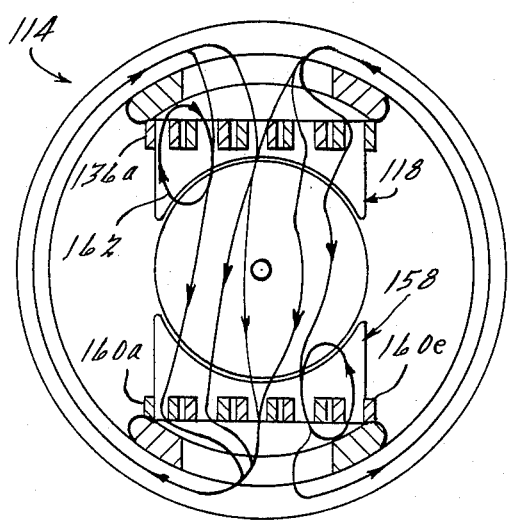
FIG. 7 is another view of the D.C. electric motor of FIG. 6, particularly illustrating the general direction of the magnetic flux paths through the motor when one of the field control coils in each field pole member is energized magnetically substractive to the flux generated by the field coils.

Referring to FIG. 7 another view of the D.C. electric motor 114 is shown. This view particularly illustrates the general direction of the magnetic flux paths through the motor 114 when one of the field coils in each of the field pole members are energized magnetically subtractive to the flux generated by the field coils 134 and 152. Thus, in the field pole member 118, the field control coil 136a will be energized, and in the field pole member 158, a field control coil 160e will be energized. The magnetic flux line 162 generated by the field control coil 136a is shown to follow a circular path in a direction which opposes the magnetic flux generated by the field coil 134 through the field pole leg member 128a. Accordingly, it will be seen that the core portion 126 permits a return path for the magnetic flux line 162 through the field pole leg member 128b. It should be noted that the magnetic flux line 154 of FIG. 6 no longer flows through the field pole leg member 128a, but rather the flux represented by this flux line is shifted across the face portion 124 such that it will flow through the field pole leg member 128b. It should also be noted that with the other field control coils de-energized, the magnetic flux from the field coils may flow un-impeded through the field leg members 128b–e.

Figure 8:
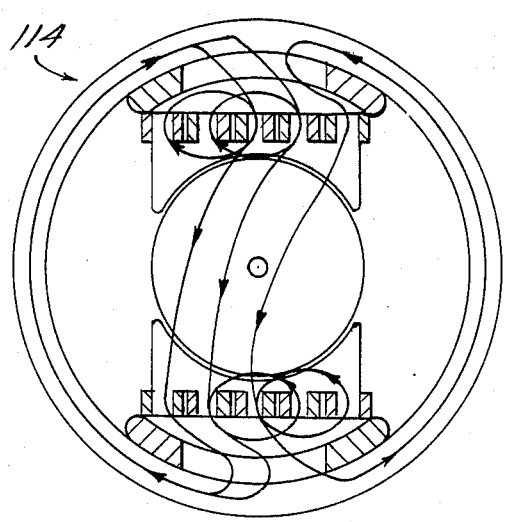
FIG. 8 is another view of the D.C. electric motor of FIG. 6, particularly illustrating the general direction of the magnetic flux paths through the motor when two of the field control coils in each field pole member are energized magnetically substractive to the flux generated by the field coils.
Figure 9:
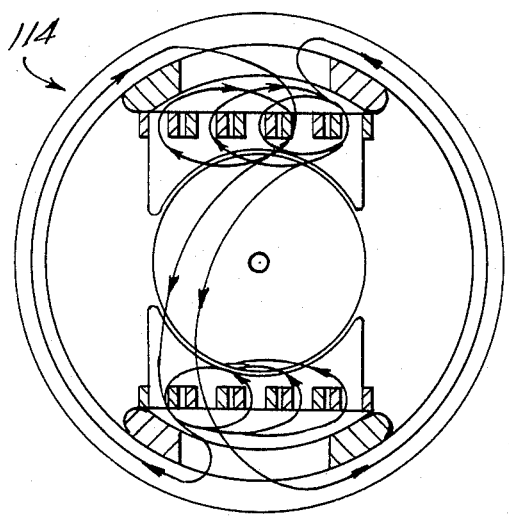
FIG. 9 is another view of the D.C. electric motor of FIG. 6, particularly illustrating the general direction of the magnetic flux paths through the motor when three of the field control coils in each field pole member are energized magnetically substractive to the flux generated by the field coils.
Figure 10:
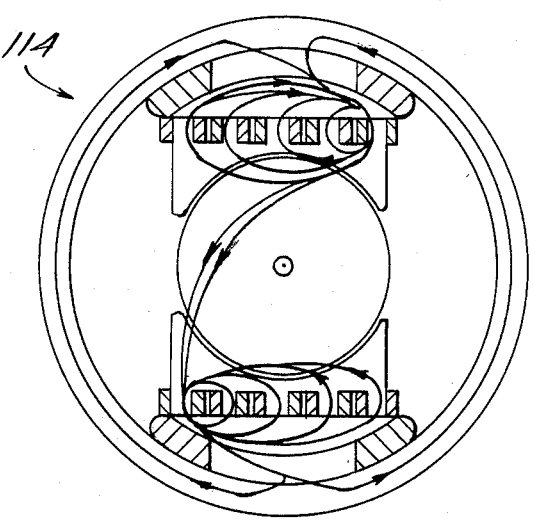
FIG. 10 is another view of the D.C. electric motor of FIG. 6, particularly illustrating the general direction of the magnetic flux paths through the motor when four of the field control coils in each field pole member are energized magnetically substractive to the flux generated by the field coils.

Referring to the FIGS. 8, 9 and 10, these figures each show an additional view of the D.C. electric motor 114 with an increasing number of field control coils energized magnetically subtractive to the flux generated by the field coils 134 nd 152. It should be understood that the flux lines shown in these figures are intended to represent only the direction of magnetic flux flow, and that many more flux lines will actually be present and flowing through the motor 114. It should be noted that in the progression from FIGS. 6 through 10 the magnetic flux lines are increasingly shifted across the face portions of the field pole members as the number of field control coils are energized magnetically subtractive to the flux generated by the field coils 134 and 152. Thus, it will be seen in FIG. 10 that the magnetic flux lines are concentrated over a very narrow portion or section of the field pole face portions of the motor. This will achieve not only a reduction in the number of active armature coil turns, but this highly concentrated magnetic flux also enable the motor 114 to generate a relatively high torque even though the speed of the motor is substantially maximized.

Figure 11:
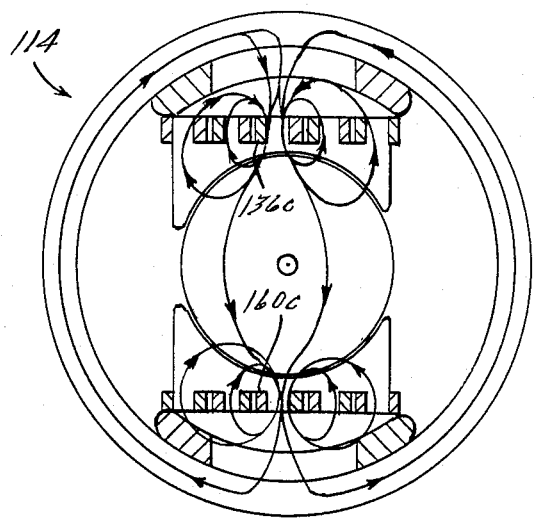
FIG. 11 is another view of the D.C. electric motor of FIG. 6, particularly illustrating the general direction of the magnetic flux paths through the motor when all of the field control coils are energized magnetically substractive to the flux generated by the field coils, except for the center field control coil in each field pole member.

While FIGS. 6 through 10 illustrate one partial sequence of energizing the field control coils 136a–e and 160a–e, FIG. 11 illustrates another sequence which may be employed in accordance with the present invention. Whereas FIGS. 6 through 10 illustrate the concentration of the magnetic flux generated by the field coils 134 and 152 from one side of the field pole members to the other, FIG. 11 illustrates the concentration of this magnetic flux towards the center of the field pole members. Specifically, FIG. 11 illustrates the general direction of the magnetic flux paths through the motor 114 when all of the field control coils are energized magnetically subtractive to the flux generated by the field coils, except for the center field control coil in each of the field pole members, namely field control coils 136c and 160c. The advantage of this sequence is that the sequence may be employed regardless of the motor direction. In the previous sequence where the magnetic flux is pushed from one side of the field pole members to the other, it may be advantageous to begin the sequence from one side or the other of the field pole members depending upon which direction the armature 120 is turning. However, in the sequence illustrated in FIG. 11, the motor 114 may be readily reversed without resorting to a change in the sequence of energizing the field control coils.

As illustrated in FIGS. 7–11, the lines of magnetic flux generated by the field control coils 136a–e cut or pass through a portion of the armature 120. This is especially advantageous because not only will the magnetic flux generated by subtractively energized field coils cause a shift in the magnetic flux generated by the field coils and thereby reduce the counter E.M.F. of the armature, but the magnetic flux generated by these field control coils will themselves induce a voltage in the armature opposing the counter E.M.F. of the armature. This opposing voltage will operate to further reduce the counter E.M.F. of the armature and increase the speed of the motor. Thus, it will be appreciated that when at least a portion of the magnetic flux generated by the subtractively energized field control coils cuts at least one of the armature coils 144, not only will the contribution to the counter E.M.F. by the shifted field coil magnetic flux be removed but a voltage having the same polarity as the applied armature voltage will be induced in the armature coil(s). Whether or not the magnetic flux generated by the field control coils will be sufficient to pass through a portion of the armature will depend upon a combination of stator assembly geometry described above and the strength of the field control coils (i.e. the voltage applied to the field control coils). Accordingly, the depth of the field pole face portion 124 between the field control coils and the face portion surface 138 should be such as to permit a significant or substantial portion of the field control coil magnetic flux to cut at least one of the armature coils.

It should also be understood that the foregoing description is that of a preferred embodiment of the invention. Various changes and modifications may be made without departing from the spirit and scope of the invention as defined by the appended claims.

What is claimed is:

1. A D.C. electric motor stator assembly, comprising:

a yoke member; and at least one pair of opposing pole means associated with said yoke member for generating a magnetic field which is variable across a face portion of said pole means, each of said pole means including a plurality of separately excitable field control coils for selectively varying the density and direction of the magnetic flux along said face portion of said pole means; said pole means includes a field pole member having a shank portion mounted to said yoke member, a plurality of spaced, generally radially extending field pole leg members associated with said face portion, and a core portion interposed radially between said shank portion and said face portion for providing a magnetic path between said shank portion and said face portion, and a field coil wound around said shank portion; and wherein said field control coils are wound individually around said field pole leg members; wherein said core portion of said field pole members has sufficient radial depth to permit the magnetic flux in said field pole members to shift across said face portion when one or more of said field control coils are energized magnetically subtractive to the flux generated by said field coils, such that said magnetic flux generated by said field coils is shifted away from said substractively energized field control coil(s) and concentrated in a predeterminable portion of said field pole face portion; wherein said face portion is constructed to provide for a continuous, generally cylindrical surface as the bore for receiving said armature.

2. The stator according to claim 1, wherein said base portion is further constructed to provide for a radial depth which resists the magnetic flux shifted by at least one field control coil energized magnetically subtractive to the magnetic flux generated by said field coils from shifting back across said pole face portion.

3. The stator assembly according to claim 2, wherein the radial depth of said face portion is narrower in the center of said field pole member than at the ends of said field pole member.

4. The stator assembly according to claim 2, wherein said field pole leg members define slots for receiving said field control coils.

5. The stator assembly according to claim 4, wherein said field pole leg members are spaced and said field control coils are wound such that an air gap is provided between adjacent field control coils.

6. The stator assembly according to claim 5, wherein said leg portion extends across said field pole members such that a field pole leg member is provided at each end of said field pole members, and said field control coils include a field control coil wound around said end field pole leg members.

7. The stator assembly according to claim 6, wherein all of said field control coils are aligned in a single row across each of said field pole members.

8. The stator assembly according to claim 7, wherein said field pole leg members and said face portion form a first unitary body, and said core and shank portions form a second unitary body, said first unitary body being mounted to said second unitary body.

9. The stator assembly according to claim 6, wherein each of said field pole members include at least three field control coils.

10. The stator assembly according to claim 9, wherein each of said field pole members include five field control coils.

11. The stator assembly according to claim 6, wherein said field control coils are each wound on a bobbin and said bobbins are mounted individually on said field pole leg members.

12. An improved D.C. electric motor of the type having an armature, a commutator, and a brush assembly, wherein the improvement comprises:

a yoke member; and at least one pair of opposing pole means associated with said yoke member for generating a magnetic field which is variable across a face portion of said pole means, each of said pole means including a plurality of separately excitable field control coils for selectively varying the density and direction of the magnetic flux along said face portion of said pole means; wherein each of said pole means includes a field pole member having a shank portion mounted to said yoke member, a plurality of spaced, generally radially extending field pole leg members associated with said face portion, and a core portion interposed radially between said shank portion and said face portion for providing a magnetic path between said shank portion and said face portion, and a field coil wound around said shank portion of said field pole member, and wherein said field control coils are wound individually around said field pole leg members of said field pole member and are operable to shift the magnetic flux generated by said field coil across said face portion when one or more of said field control coils are energized magnetically subtractive to the flux generated by said field coil, such that the magnetic flux generated by said field coil is shifted away from said subtractively energized field control coil(s) and concentrated over a predeterminable portion of said field pole face portion; wherein at least a portion of the magnetic flux generated by at least one of said field control coils energized magnetically subtractive to the magnetic flux generated by said field coils cuts at least one of the coils of said armature; wherein said face portion is constructed to provide for a continuous, generally cylindrical surface as the bore for receiving said armature.

13. The stator assembly according to claim 12, wherein said face portion is further constructed to provide for a radial depth which resists the magnetic flux shifted by at least one field control coil energized magnetically subtractive to the magnetic flux generated by said field coils from shifting back across said pole face portion.

14. The stator assembly according to claim 13, wherein the radial depth of said face portion is narrower in the center of said field pole member than at the ends of said field pole member.

15. The improved D.C. electric motor according to claim 13, wherein said field control coils are energized by a D.C. power source in a predetermined sequence for controlling the speed of said D.C. electric motor.

16. The improved D.C. electric motor according to claim 15, wherein one or more of said field control coils are energized by said D.C. power source magnetically subtractive to the flux generated by said field coils for increasing the speed of said D.C. electric motor.

17. The improved D.C. electric motor according to claim 15, wherein one or more of said field control coils are energized by said D.C. power source magnetically additive to the flux generated by said field coils for decreasing the speed of said D.C. electric motor.

18. The improved D.C. electric motor according to claim 16, wherein the energization of one or more of said field control coils, in each of said field pole members, magnetically subtractive to the flux generated by said field coils shifts the resulting magnetic flux across said face portion of said field pole members, thereby decreasing the counter E.M.F. generated by said armature.

19. The improved D.C. electric motor according to claim 18, wherein said field pole leg members define slots for receiving said field control coils.

20. The improved D.C. electric motor according to claim 19, wherein said field pole leg members are spaced and said field control coils are wound such that an air gap is provided between adjacent field control coils.

21. The improved D.C. electric motor according to claim 19, wherein said leg portion extends across said field pole members such that a field pole leg member is provided at each end of said field pole members, and said field control coils include a field control coil wound around said end field pole leg members.

22. The improved D.C. electric motor according to claim 21, wherein all of said field control coils are aligned in a single row across each of said field pole members.

23. The improved D.C. electric motor according to claim 22, wherein said field pole leg members and said face portion form a first unitary body, and said core and shank portions form a second unitary body, said first unitary body being mounted to said second unitary body.

24. The improved D.C. electric motor according to claim 21, wherein each of said field pole members include at least three field control coils.

25. The improved D.C. electric motor according to claim 24, wherein each of said field pole members include five field control coils.

26. The improved D.C. electric motor according to claim 21, wherein said field control coils are each wound on a bobbin and said bobbins are mounted individually on said field pole leg members.

27. The improved D.C. electric motor according to claim 26, wherein said D.C. electric motor includes two pairs of opposing field pole members.

28. The improved D.C. electric motor according to claim 18, wherein said D.C. motor comprises a propulsion motor in an electric vehicle.

* * * * *

UNITED STATES PATENT AND TRADEMARK OFFICE
CERTIFICATE OF CORRECTION

PATENT NO. : 4,511,831

DATED : April 16, 1985

INVENTOR(S) : STIRLING A. McINNIS

It is certified that error appears in the above-identified patent and that said Letters Patent is hereby corrected as shown below:

| | | |
|---|---|---|
| Column 3, line 12 | delete "motors" and insert therefore --motor-- |
| Column 3, line 46 | delete "substractive" and insert therefor --subtractive-- |
| Column 4, line 41 | delete "been" and insert therefor --can be-- |
| Column 4, line 43 | delete "geneally" and insert therefor --generally-- |
| Column 5, line 52 | delete "enrgized" and insert therefor --energized-- |
| Column 6, line 36 | delete "48" and insert therefor --42-- |
| Column 7, line 4 | delete "disconnect" and insert therefor --disconnected-- |
| Column 7, line 44 | delete "as" and insert therefor --at-- |
| Column 8, line 64 | delete "sligly depressed" and insert therefor --slightly depresses-- |
| Column 10, line 41 | delete "would" and insert therefor --wound-- |
| Column 11, line 56 | delete "surfaces" and insert therefor --surface-- |

UNITED STATES PATENT AND TRADEMARK OFFICE
CERTIFICATE OF CORRECTION

PATENT NO. : 4,511,831                  Page 2 of 2

DATED : April 16, 1985

INVENTOR(S) : Stirling A. McInnis

It is certified that error appears in the above-identified patent and that said Letters Patent is hereby corrected as shown below:

| | |
|---|---|
| Column 12, line 47 | delete "base" and insert therefore --face-- |
| Column 12, line 64 | delete "comferentially" and insert therefor --circumferentially-- |
| Column 13, line 59 | insert --pole-- after "field" |
| Column 13, line 64 | delete "nd" and insert therefor --and-- |
| Column 14, line 11 | delete "enable" and insert therefor --enables-- |
| Column 15, line 9 | delete "." after A |
| Column 15, line 37 | delete "substractively" and insert therefor --subtractively-- |

*Denotes our error

Signed and Sealed this

Twenty-sixth Day of November 1985

[SEAL]

Attest:

DONALD J. QUIGG

Attesting Officer      Commissioner of Patents and Trademarks